Patented Oct. 12, 1948

2,451,351

UNITED STATES PATENT OFFICE 2,451,351

PRODUCTION OF UNSATURATED KETONES

Henry O. Mottern, Hillside, and Vincent F. Mistretta, Fanwood, N. J., assignors to Standard Oil Development Company, a corporation of Delaware No Drawing. Application December 13, 1945, Serial No. 634,884

11 Claims. (Cl. 260—593)

The present invention relates to a process for making unsaturated ketones by the condensation of an aliphatic ketone with an aliphatic aldehyde in the presence of hydrogen and a specially prepared catalyst.

One of the objects of this invention is to prepare unsaturated ketones.

Another object of this invention is to prepare a catalyst which promotes the reaction between an aliphatic aldehyde and an aliphatic ketone in the presence of hydrogen to yield an unsaturated ketone.

Another object of this invention is to prepare certain unsaturated ketones by a one step reaction which would have required many steps to synthesize by the methods previously available.

Another and further object of this invention is to make available to the art a process whereby unsaturated ketones can be made economically by one reaction step.

Still another object of this invention is to react an aldehyde with a ketone in a one stage process to form an unsaturated ketone substantially directly.

A still further object of this invention is to provide a process for the manufacture of unsaturated ketones which may be operated in a continuous manner.

Still other objects will be apparent to those skilled in the art from the following detailed description of the invention and from the claims.

Heretofore unsaturated ketones have been made by many methods among which was one wherein the use of an alkaline or alkaline earth base or salt was required as a catalyst in a condensation which was run in the liquid phase. The product isolated from this liquid phase reaction was a keto-alcohol from which it was necessary to remove water in a second reaction step in order to produce the unsaturated ketone. Difficulty in the addition of one molecule of aldehyde to one of ketone or vice versa has been encountered when prior art procedures have been attempted. Several vapor phase catalytic condensations which yield an unsaturated ketone have been described in the prior art; an example of this is Brant and Hasche U. S. Pat. No. 2, 245,567.

It has now been discovered that unsaturated ketones can be made by a condensation of an aldehyde with a ketone in the presence of hydrogen and a catalyst prepared by mixing oxides of the second and fifth groups of the periodic system. This represents a substantial improvement over prior art procedures in that more substantial yields of product are obtained and a number of unsaturated ketones not previously available may readily be prepared. The practice of this invention requires that the aldehyde and ketone be passed over the catalyst while in the vapor form. The temperature at which the vapors are passed over the catalyst may vary somewhat depending upon the particular aldehyde and ketone used but in general is within the range of 200-600° C. The temperature chosen should be such that it is below the decomposition temperature of the reactants and furthermore the temperature should be such that it is still within the above range but as far removed as possible from the temperature at which the reactants tend to condense separately to produce such compounds as aldol resulting from the condensation of two molecules of aldehyde, and compounds like diacetone alcohol which results from the condensation of two molecules of acetone.

A further requirement for the practice of this invention is that the vapors of the organic reactants be mixed with hydrogen before their passage over the catalyst. Without hydrogen, the amount of condensate is very small but with hydrogen present in the vapors the amount of the reactants condensing to give unsaturated ketones is from 10.0-25.0 per cent of the original aldehyde and ketone for a single pass through the catalyst chamber. A possible explanation of this effect engendered by the presence of hydrogen in the vapors of the reactants passing over the catalyst is that the hydrogen increases the basicity of the oxide catalyst and that a catalyst activated in such manner is far more active in the promotion of this particular condensation than a catalyst without such activation.

It may be desirable to use an excess of hydrogen over that required to activate the catalyst since it is of advantage to have the gases mixed with an inert diluent which allows of temperature control in the catalyst chamber for the exothermic reaction between aldehyde and ketone molecules.

Some of the unsaturated ketones prepared according to this invention are known chemical compounds but because of the specific action of the catalyst hereinafter described in detail, the methyl group of methyl ketones is condensed with the aldehyde group of the aldehyde and thus where methyl ketones are used the resulting unsaturated ketone is a straight chain compound. An example to illustrate this is the reaction of methyl ethyl ketone with acetaldehyde: by the process of this invention the product is hexene-2 one-4 as the major product, rather than other possible condensation products such as 3-methyl pentene-2 one-4 or 3-methyl pentene-3 al-5.

The unsaturated ketones produced by this invention are represented by the graphic formula:

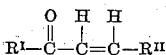

where $R^I$ and $R^{II}$ are each selected from the group consisting of alkyl, aryl, alkaryl, and aralkyl. They have a variety of uses such as their use as denaturants, they may also be polymerized to give products of higher molecular weight or may be subjected to an extreme polymerization and condensation process to yield resins and high molecular weight polymers. Since the unsaturated ketones have two reactive positions, i. e., the ketone and ethylene bond, they may be used as starting materials in the synthesis of other organic compounds of great variety.

The catalyst used in this process is prepared by mixing oxides of the second and fifth groups of the periodic system. The oxide chosen from group II may form the major portion of the mixture, that is, it is preferred to have this oxide present in the mixture of oxides in an excess of 50% by weight, although it is possible to use a mixture of oxides containing greater than 50% by weight of $Bi_2O_3$. An example of oxides and amounts of each which give a satisfactory catalyst is 94 parts of zinc oxide and 6 parts of bismuth trioxide ($Bi_2O_3$). In the preparation of the catalyst the oxides are intimately mixed and one successful method of doing this is to make an aqueous slurry of the oxides, the slurry can then be converted into a dry material by removal of the water and pulverization. It may be desirable to incorporate the oxide mixture onto an inert carrier and carriers suitable for this purpose are diatomaceous earth, bentonite, talc, steel machine turnings, etc. The oxide mixture acts to catalyze the condensation of aldehyde and ketone as well as to catalyze the elimination of water from the condensation product, with the result that the product of the reaction is an unsaturated ketone. A satisfactory catalyst does not require the presence of a special dehydration promoting substance such as silica or alumina gel or activated alumina.

The reaction may be carried out in any suitable apparatus. The aldehyde and ketone may be vaporized in different vaporizers or in the same vaporizer. The vaporizer system is to be connected with a catalyst chamber containing catalyst of the character described in some detail above. There is a means for introducing hydrogen into the vaporized aldehyde and ketone and the hydrogen may be mixed with a mixture of the vapors of aldehyde or ketone or with the vapors of one or the other in case the aldehyde and ketone are vaporized separately. The hydrogen may be introduced at the point of entry of the mixed aldehyde-ketone vapors into the catalyst chamber. In all cases, however, it is essential that the mixing of hydrogen with the other vapors be conducted in such a manner that the aldehyde-ketone vapors are not altered with respect to temperature to such a degree that the desired reaction temperature is not obtained in the catalyst chamber. The liquid mixture of reactants may be dropped onto the hot catalyst and thus vaporized in the catalyst chamber. By this method all of the heat supplied externally may be directed to the catalyst chamber. If desired, suitable provision for passing the incoming materials in heat exchange with the outgoing reaction products can be provided. The catalyst chamber may be connected to a condenser and this unit may be then connected to distillation apparatus, polymerization equipment or other such apparatus, depending upon the subsequent treatment which it is desired to apply to the unsaturated ketone produced.

The invention is illustrated by the following examples but it is to be understood that the examples are set forth only for the purpose of illustration and are not to be construed as limiting the invention in any way.

*Example I*

A catalyst was prepared by mixing 94 parts of ZnO by weight with 6 parts of $Bi_2O_3$ by weight. This mixture was slurried with water. The slurry was mixed with steel machine turnings so that the turnings were completely coated with the slurry and then the coated turnings were dried. The turnings were placed in a metal tube and the catalyst volume was 120 c. c. The tube was heated in a metal bath to 750° F. A mixture of acetone and acetaldehyde in the liquid form and in approximately equimolar proportions was fed into the tube containing the catalyst at the rate of ¾ volume of blend per volume of catalyst per hour, that is, approximately 90 c. c. (liquid) of blend per hour. 22.2 mols of acetaldehyde (1210 c. c.) and 21.7 mols of acetone (1590 c. c.) were passed through the tube along with 1.199 cubic feet of hydrogen per hour which was mixed with the vapors of the blend just before passing over the catalyst. This amounts to one mole of hydrogen per mole of blend.

The following substances were isolated from this pass-through:

Acetaldehyde _____ 20.0 parts (1092 c. c.)
Acetone _____ 19.5 mols (1428 c. c.)
Pentene-2 one-4 ___ 2.2 mols (200 c. c. or 186 g.)

This represents a conversion to an unsaturated aldehyde of 10% accomplished by this single pass-through of the acetone and acetaldehyde.

*Example II*

A mixture of oxides composed of 94% by weight of magnesium oxide and 6% by weight of bismuth trioxide was slurried with water and deposited on steel turnings which were then dried. A tube containing 120 c. c. of the turnings was heated in a metal bath to 750° F. and held at that temperature during the course of the reaction. 900 c. c. of a mixture of acetaldehyde and methyl ethyl ketone, which was 63 volume percent methyl ethyl ketone, was fed as a liquid into the reaction tube along with hydrogen at the rate of 1½ cubic feet per hour. The vapors issuing from the reaction tube were condensed and the total volume of liquid obtained was 886 c. c. 868 c. c. of this liquid was fractionated and after the unchanged reactants had been distilled 24 c. c. of reaction product was obtained. This represents a content in the liquid condensate of 2.9 volume percent.

*Example III*

A mixture of oxides composed of 94% by weight of magnesium oxide and 6% by weight of vanadium pentoxide was slurried with water and deposited on steel turnings which were then dried. A tube containing 120 c.c. of the turnings was heated in a metal bath to 750° F. and held at that temperature during the course of the reaction. 900 c. c. of a mixture of acetaldehyde and methyl ethyl ketone, which contained 63 volume percent of the latter, was fed as a liquid into the reaction tube along with hydrogen at the rate of 1½ cubic feet per hour. The vapors issuing from the reaction tube were condensed and the total volume of liquid obtained was 886 c. c. 860 c. c. of this liquid was fractionated and after the unchanged reactants had distilled 34.5 c. c. of reaction product was obtained. This represents a content in the liquid condensate of 4% by volume.

The process contemplated by this invention can be successfully and economically operated in a continuous manner. Since a large proportion of the aldehyde and ketone are unchanged by passage through the catalyst chamber they can be purified from the products of the reaction and recycled to the catalyst chamber with hydrogen to form more unsaturated ketone. The hydrogen which is mixed with the gases entering the catalyst chamber is not diminished in amount in said chamber, therefore the gaseous material leaving the catalyst chamber will contain as much hydrogen as was introduced into the chamber. Upon recycling the unchanged aldehyde and ketone the hydrogen may also be recycled and thus only slight amounts if any hydrogen need be added to the gases entering the catalyst chamber. The products of the reaction are the result of a condensation of two molecules of the reactants and thus have a higher molecular weight and a consequent higher boiling point than the reactants. Therefore, it may not be necessary, in order to separate the products of the reaction from the reactants, to cool the gases issuing from the catalyst chamber below a temperature at which the reaction products would condense to liquids. The reactants could always be maintained at a temperature above the temperatures at which they vaporize during the recycling to the catalyst chamber and thus obviate the consumption of a substantial part of the heat required to originally raise the reactants from a liquid to a vapor at a temperature required by the reaction.

The hydrogen which has passed through the catalyst chamber may be separated from the reaction products and used for the hydrogenation of the unsaturated ketone or may be put to other uses.

The amount of condensate formed in the practice of our invention is usually within the range of 10.0–25.0 percent of the initial aldehyde and ketone used. The yield of desired unsaturated ketone based on aldehyde and ketone converted is usually within the range of 80–90 percent. The 10–20 percent which represents condensation products other than that desired consisted of other unsaturated ketonic and aldehydic materials which are themselves capable of recovery and purification and are useful products.

A satisfactory range for the rate of feed may vary widely but the preferred range is from 0.25 to 2.0 volumes of liquid blend of aldehyde and ketone per volume of catalyst per hour. When the rate at which the blend is passed through the catalyst chamber is low there is more condensation taking place than when the rate is higher. When the rate is substantially greater than 2.0 there is less conversion for each pass-through. However, when the rate is substantially lower than 0.25 v./v./hr. the products may have a larger molecular weight and there may be resinification and decomposition of the unsaturated ketone.

If the temperature rises higher than 600° C. substantial amounts of condensate resulting from the interaction of more than two molecules of reactants resinification and/or decomposition may be the result and the product will consequently be lower in percentage yield of the desired unsaturated ketone. When the temperature is below 200° C. the individual reactants may condense with themselves. The preferred temperature range is 350° to 450° C.

What is claimed and desired to secure by Letters Patent is:

1. A process for the reaction of a saturated aliphatic methyl ketone with a saturated aliphatic aldehyde which comprises preparing a vaporous mixture consisting of the ketone, the aldehyde and hydrogen, reacting the material in the presence of a catalyst consisting of an oxide of a metal selected from group II and an oxide of a metal selected from group V of the periodic table and cooling the resultant reaction materials containing unsaturated ketone.

2. A process for the reaction of a saturated aliphatic methyl ketone with a saturated aliphatic aldehyde which comprises preparing a vaporous mixture consisting of the ketone, the aldehyde and hydrogen, reacting the material in the presence of a catalyst consisting of more than 50% by weight of an oxide of a metal selected from group II and less than 50% by weight of an oxide of a metal selected from group V of the periodic table and cooling the resultant reaction materials containing unsaturated ketone.

3. A process according to claim 2 in which the aldehyde is acetaldehyde and the ketone is acetone.

4. A process for the reaction of a saturated aliphatic methyl ketone with a saturated aliphatic aldehyde which comprises preparing a vaporous mixture consisting of the ketone, the aldehyde and hydrogen, reacting the material at a temperature between 200° C. and 600° C. and in the presence of a catalyst consisting of an oxide of a metal selected from group II and an oxide of a metal selected from group V of the periodic table and cooling the resultant reaction materials containing unsaturated ketone.

5. A process for the reaction of a saturated aliphatic methyl ketone with a saturated aliphatic aldehyde which comprises preparing a vaporous mixture consisting of the ketone, the aldehyde and hydrogen, reacting the material at a temperature between 200° C. and 600° C. and in the presence of more than 50% by weight of an oxide of a metal selected from group II and less than 50% by weight of an oxide of a metal selected from group V of the periodic table and coating the resulting reaction materials containing unsaturated ketone.

6. A process for the reaction of a saturated aliphatic methyl ketone with a saturated aliphatic aldehyde which comprises preparing a vaporous mixture consisting of the ketone, the aldehyde and hydrogen, reacting the material at a temperature between 200° C. and 600° C. and in the presence of a mixture of more than 50% by weight of an oxide of a metal selected from group II, less than 50% by weight of an oxide of a metal selected from group V of the periodic table and an inert carrier and cooling the resultant reaction materials containing unsaturated ketone.

7. A process for the reaction of a saturated aliphatic methyl ketone with a saturated aliphatic aldehyde which comprises obtaining a vaporous blend having substantially equimolar amounts of a ketone and an aldehyde and mixing an amount of hydrogen greater than one mole for each mole of aldehyde-ketone blend with the blend, contacting the vaporous blend at a temperature between 200° C. and 600° C. with a mixture of more than 50% by weight of an oxide of a metal selected from group II, less than 50% by weight of an oxide of a metal selected from group V of the periodic table and an inert carrier and recovering unsaturated ketone from the reaction products.

8. A process for the reaction of a saturated aliphatic methyl ketone with a saturated aliphatic aldehyde which comprises obtaining a vaporous blend having substantially equimolar amounts of a ketone and an aldehyde and mixing an amount of hydrogen greater than one mole for each mole of aldehyde-ketone blend with the blend passing the blend containing hydrogen over a catalyst mixture consisting of more than 50% by weight of an oxide of a metal selected from group II, less than 50% by weight of an oxide of a metal selected from group V of the periodic table and an inert carrier at a rate within the range of 0.25 to 2.0 liquid volume of blend per volume of catalyst per hour and recovering unsaturated ketone from the reaction products.

9. A process according to claim 8 in which the catalyst is composed of ZnO and $Bi_2O_3$ and the carrier is steel machine turnings.

10. A process according to claim 8 in which the aldehyde is acetaldehyde and the ketone is acetone.

11. A process according to claim 1 in which the aldehyde is acetaldehyde and the ketone is methyl ethyl ketone.

HENRY O. MOTTERN.
VINCENT F. MISTRETTA.

REFERENCES CITED

The following references are of record in the file of this patent:

UNITED STATES PATENTS

| Number | Name | Date |
| --- | --- | --- |
| 2,245,567 | Brant | June 17, 1941 |